United States Patent

Petrilli et al.

Patent Number: 5,860,882
Date of Patent: Jan. 19, 1999

[54] PROCESS FOR MANUFACTURING PHASED SPROCKET ASSEMBLIES BY CAPACITOR DISCHARGE WELDING

[75] Inventors: Rocco Petrilli, Trumansburg; Stephen P. Watson, Freeville, both of N.Y.

[73] Assignee: Borg-Warner Automotive, Inc., Sterling Heights, Mich.

[21] Appl. No.: 846,324

[22] Filed: Apr. 30, 1997

Related U.S. Application Data

[63] Continuation-in-part of Ser. No. 595,038, Jan. 31, 1996, Pat. No. 5,690,568.

[51] Int. Cl.$^6$ .................................................. F16H 55/17
[52] U.S. Cl. ...................... 474/158; 474/160; 29/893.1; 29/893.37
[58] Field of Search .................................. 474/152, 158, 474/160, 164; 29/893, 893.1, 893.37

[56] References Cited

U.S. PATENT DOCUMENTS

| | | |
|---|---|---|
| 3,641,305 | 2/1972 | Ritter et al. ........................ 219/99 |
| 3,750,263 | 8/1973 | Satzler et al. . |
| 3,838,786 | 10/1974 | Bachmann et al. ................ 219/98 |
| 3,852,559 | 12/1974 | Tauern ............................... 210/98 |
| 3,984,653 | 10/1976 | Blaas et al. ....................... 219/98 |
| 4,083,094 | 4/1978 | Silvestri . |
| 4,086,817 | 5/1978 | Jon et al. .......................... 73/587 |
| 4,095,323 | 6/1978 | Silvestri . |
| 4,132,879 | 1/1979 | Glorioso ............................ 219/98 |
| 4,672,164 | 6/1987 | Devletian .......................... 219/96 |
| 4,690,009 | 9/1987 | Rakhit ............................... 74/409 |
| 5,359,771 | 11/1994 | Krehl et al. ...................... 29/893 |
| 5,427,580 | 6/1995 | Ledvina et al. .................. 474/84 |

FOREIGN PATENT DOCUMENTS

| | | |
|---|---|---|
| WO 94/05822 | 3/1994 | WIPO . |
| WO 94/14557 | 7/1994 | WIPO . |
| WO 95/14568 | 6/1995 | WIPO . |

*Primary Examiner*—Roger Schoeppel
*Attorney, Agent, or Firm*—Sidley & Austin; Greg Dziegielewski

[57] ABSTRACT

A process for manufacturing multi-tiered and/or phased sprocket assemblies using capacitor discharge welding is provided.

12 Claims, 4 Drawing Sheets

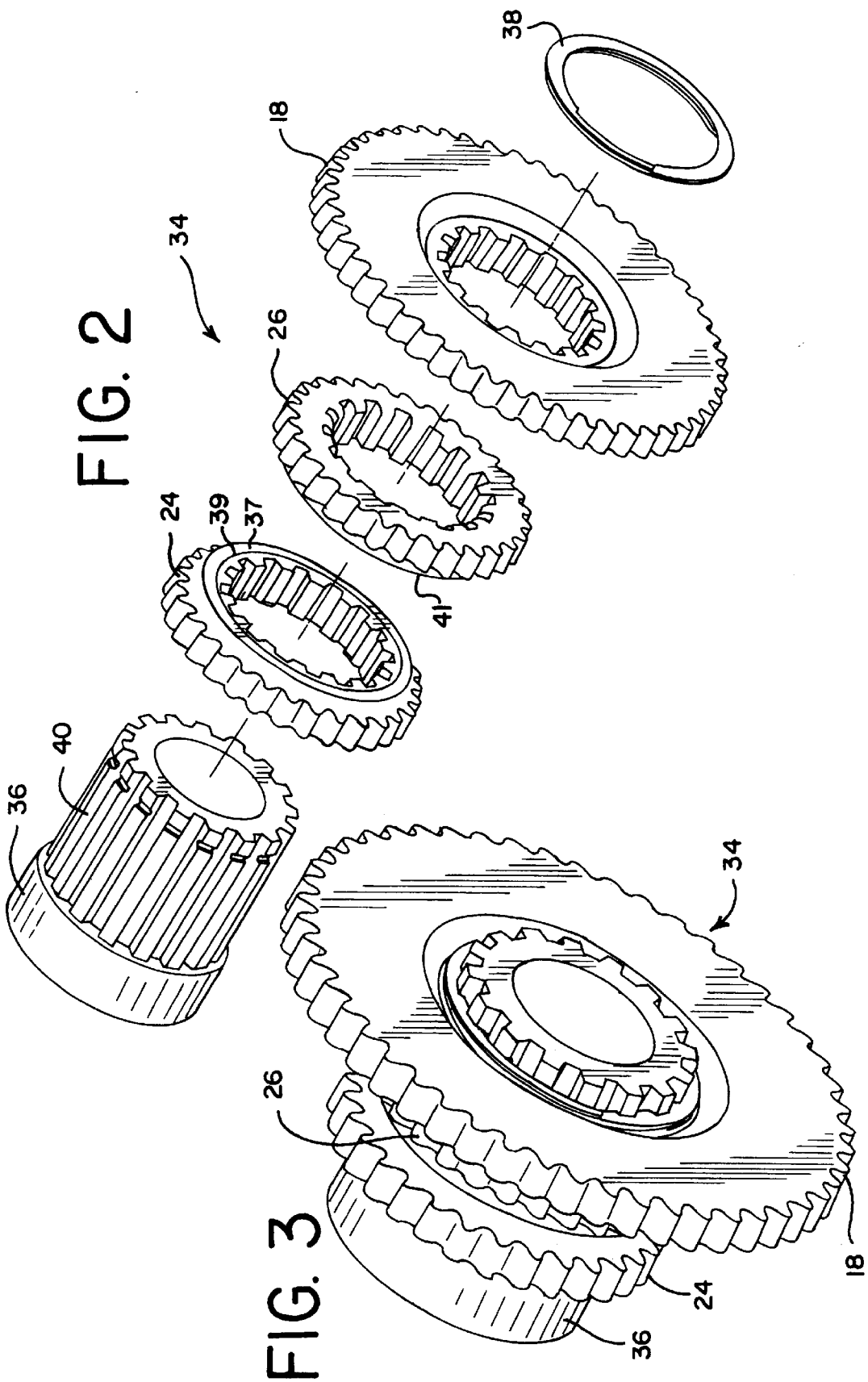

FIG. 4
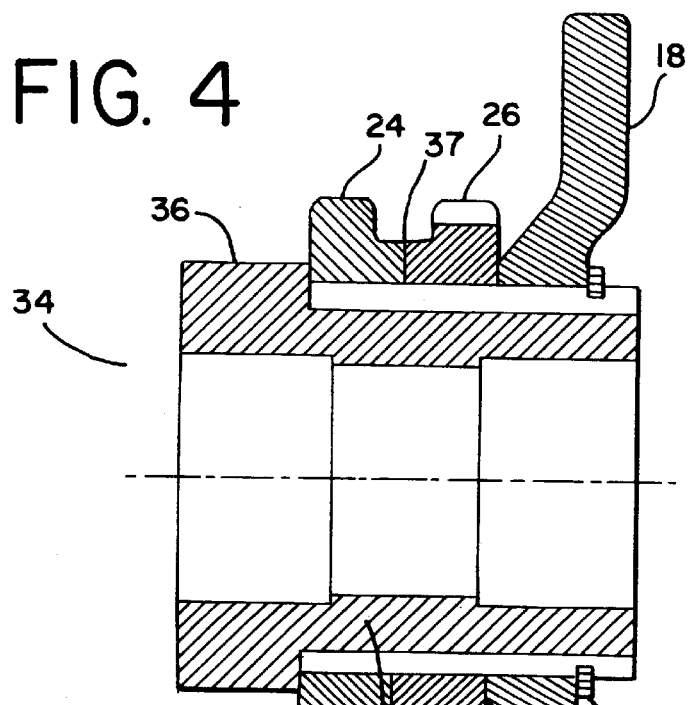
FIG. 5
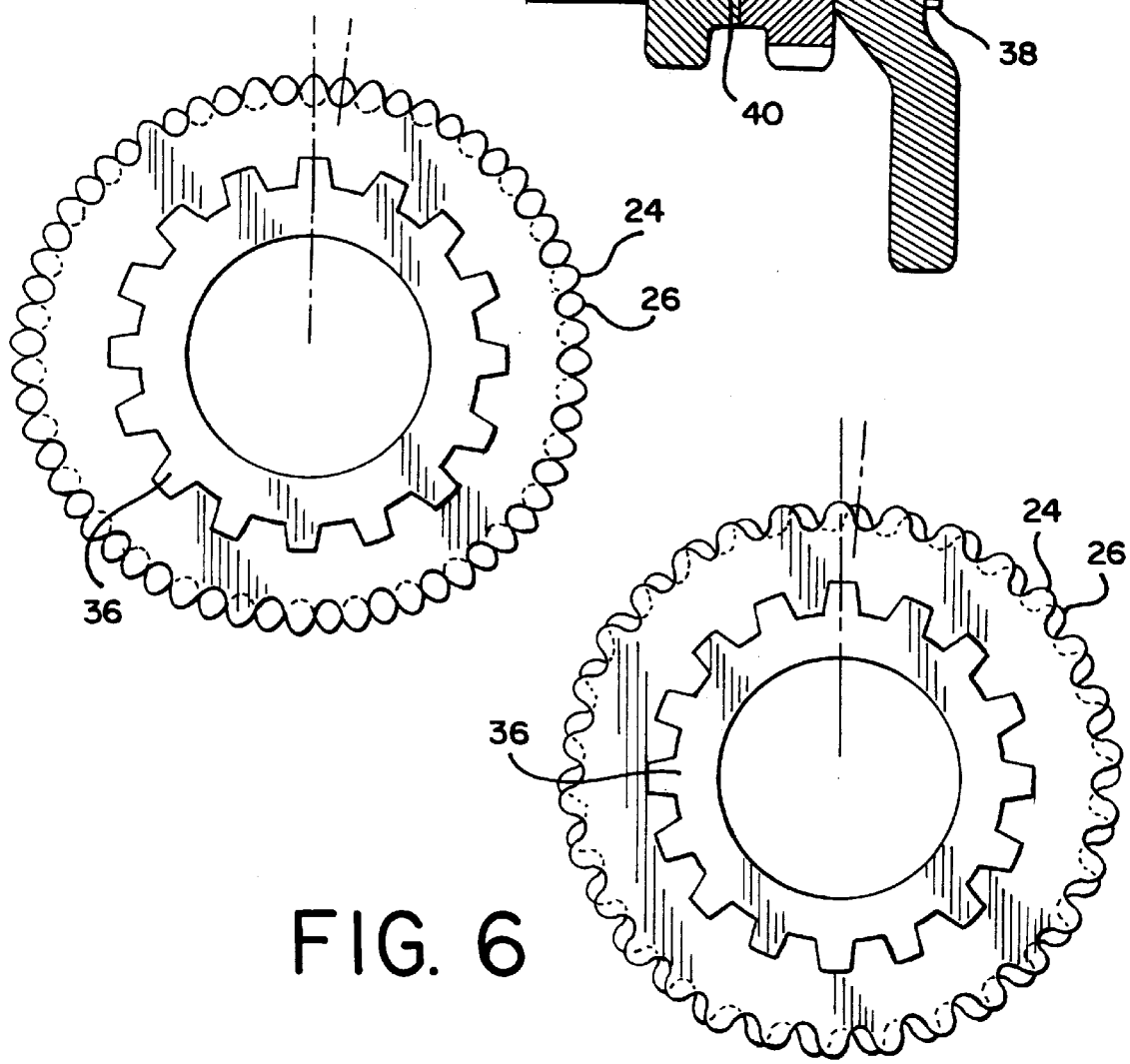
FIG. 6

PROCESS FOR MANUFACTURING PHASED SPROCKET ASSEMBLIES BY CAPACITOR DISCHARGE WELDING

This application is a continuation-in-part of U.S. patent application Ser. No. 08/595,038, "Idler Sprocket Assembly for a Phased Chain System," filed on Jan. 31, 1996, by Stephen P. Watson now U.S. Pat. No. 5,690,568.

BACKGROUND OF THE INVENTION

The present invention relates to a process for manufacturing sprocket assemblies for power transmission chain systems. More particularly, the invention relates to a process for manufacturing multi-tiered and/or phased sprocket assemblies using capacitor discharge welding.

Power transmission chains are widely used in the automotive industry in automobile transmission systems as well as in engine timing drives. Engine timing systems conventionally include at least one driving sprocket located on the crankshaft and at least one driven sprocket located on a camshaft. Rotation of the crankshaft causes rotation of the camshaft through a chain and sprocket system.

Another type of engine timing system connects the crankshaft with two overhead camshafts by a chain and sprocket system. The crankshaft connects directly to the camshafts or through an idler sprocket. In an idler sprocket system, the idler sprocket and one sprocket of each camshaft are conventionally machined on the same spline or hub. Rotation of the idler sprocket therefore causes rotation of both of the camshaft sprockets. The idler sprocket is sized to allow different rotational speeds of the crankshaft and the camshafts.

The noise associated with chain drives may be generated by a variety of sources, including the impact sound generated by the collision of chain and sprocket at the onset of meshing, and the chordal action of the chains and sprockets. The loudness of the generated impact sound is affected by, for example, the impact velocity between chain and sprocket, and the mass of the chain links contacting the sprocket at a particular moment or time increment. The meshing impact sound is generally a periodic sound that is repeated with a frequency generally equal to the frequency of the chain meshing with the sprocket. The frequency is related to the number of teeth on the sprocket and the sprocket speed. The impact can therefore produce sound having objectionable pure sonic tones.

Chordal action occurs as the chain link enters the sprocket from the free chain. The meshing of the chain and sprocket at the chain mesh frequency can cause a movement of the free chain or span (the part of the chain between the sprockets) in a direction perpendicular to the chain travel but in the same plane as the chain and sprockets. This vibratory movement can also produce an objectionable pure sonic tone at the frequency of the chain mesh frequency or a derivative thereof.

Many efforts have been made to decrease the noise level and pitch frequency distribution in chain drives so as to minimize the objectionable effects of the pure sonic tones. For example, U.S. Pat. No. 5,427,580, which is incorporated herein by reference, discloses the phasing of sprockets so as to modify the impact generated noise spectrum as well as the chordal action noise spectrum. The assemblies made using the process of the present invention may utilize concepts taught in U.S. Pat. No. 5,427,580, in an idler sprocket system.

In a phased chain system where the chains are offset by a portion of a pitch length, there is phasing of the sprockets of two overhead camshafts with respect to one another along the idler shaft. Phasing the camshaft sprockets can reduce the number of chain link teeth (or mass of chain) impacting the sprockets at the idler shaft during a given time increment. Similarly, phasing the sprockets can alter or phase the chordal or articulation of the chains and sprockets, as well as the resulting impact and chordal action generated noise.

Prior art chain drives have provided for the phasing of the overhead camshafts. However, in these chain drives, the idler sprocket and one sprocket of each camshaft are machined on a single hub along the idler shaft. Such a system requires a complicated manufacturing process to machine three sprockets on a single hub.

The selection of a sprocket manufacturing process and associated costs are influenced by sprocket geometry. For example, the need for a middle chain groove in phased sprockets contributes to the cost differential between phased and conventional sprockets. Conventional sprocket manufacturing processes are inadequate to manufacture sprockets having complex geometries and integrated features such as, for example, conventional multi-tiered sprockets (e.g., idler, balance shaft) or phased sprockets. For example, in conventional stamping and fine blanking processes, the maximum part (e.g., tooth) thickness achieved is approximately 5.00 mm. Moreover, since the use of a GRIP-FLO stamping process is limited to sprockets having simple geometries with few integrated features, it cannot be used for many silent chain applications involving complex geometric configurations and integrated features.

Powder metal technology generally comprises the formation of metal powders which are compacted and then subjected to an elevated temperature so as to produce a sintered product. See, e.g., PCT WO 94/05822 to Shivanath et al.; PCT WO 94/14557 to Jones et al.; and PCT WO 95/14568 to Hinzmann et al.

However, powder metal is difficult to weld because of its porosity. Porosity typically results in residual gases, contaminants and lubricant becoming involved with the weld. Powder metal is also difficult to weld because of its high carbon content, which, for example, results in transfer of carbon to the weld and brittleness and cracks in the material upon cooling. Thus there is a need to develop an advanced powder metal process which can sustain increasing system loading and expanded durability requirements.

Further, the use of traditional powder metal compacting technology to form complex geometries like phased sprockets in one piece has been unsuccessful. One general limitation of traditional powder metal compacting technology is the lack of ability to position the powder in the forming tooling specifically and repeatably without cold working or pre-forming. Any initial working of the powder results in laminations or flaws in the final part structure that adversely affect the performance of that part. Thus, there exists a need for an accurate and efficient process for manufacturing sprocket systems having complex geometries.

The welding operation in a capacitor discharge welding machine is known to those of ordinary skill in the art. Typically, capacitor discharge welding or pulse welding is a form of resistance welding that is achieved within milliseconds at very high current levels by utilizing energy stored in a capacitor battery or bank. See, e.g., U.S. Pat. No. 3,641,305 to Ritter et al.; U.S. Pat. No. 3,838,786 to Bachmann et al.; U.S. Pat. No. 3,852,559 to Tauern; U.S. Pat. No. 3,984,653 to Blaas et al.; U.S. Pat. No. 4,132,879 to Glorioso; U.S. Pat. No. 4,672,164 to Devletian; and U.S. Pat. No. 5,359,771 to Krehl et al.

In general, during capacitor discharge welding, electrodes are conveyed towards the mating parts or work pieces to be joined, and an extremely short pulse is given. This very quick pulse of energy heats the surfaces of both components to be welded to a plastic state, thus avoiding the mixing and creation of undesired alloys at the weld interface. The weld is typically under high pressure (e.g., 40–60 tons for typical chain sprockets), which creates a high force, low inertia weld head that yields a joint similar to those found in diffusion welds. Typically, the work pieces display no distortion or dimensional changes after capacitor discharge welding. The acceptability of the weld may be determined by, for example, techniques described in U.S. Pat. No. 4,086,817 to Jon et al.

During capacitor discharge welding, a welding projection is required on one external surface in order to create small localized areas of high heat generation, thereby minimizing any negative effects from residual heat (e.g., hardness reduction, stress cracking). Martensite that forms from high carbon and high alloy welds can be instantaneously tempered with a second pulse, reducing the hardness and eliminating any source of weld failure associated with the high carbon weld. A corresponding welding depression on a second external surface may also be employed to receive the welding projection prior to welding; the welding projections and depressions facilitate alignment of sprocket assembly components, and accommodates excess material present at the weld site.

The process of the present invention employs capacitor discharge welding to manufacture powder metal idler sprocket assemblies having complex geometric configurations and integrated features, including multi-tiered and phased powder metal sprocket assemblies. The advantages of using capacitor discharge welding to join powder metal sprocket materials include, for example, low cost formation of required projections in the powder metal tooling; quick formation of the weld so that residual gases, contaminants and lubricant, typically associated with powder metal part porosity, are absent from the weld; and significantly increased robustness of the high carbon weld, due to the plastic phase joint formation coupled with the second temper pulse.

SUMMARY OF THE INVENTION

The process of the present invention provides for the manufacture of multi-tiered and/or phased metallic sprocket assemblies using capacitor discharge welding. This process can be used to weld multiple high carbon content components to form complex sprocket geometries and/or phased sprocket assemblies.

In one embodiment, a process for manufacturing a multi-tiered and/or phased sprocket assembly having two or more metallic sprocket assembly components is provided. In this embodiment, the process comprises the steps of forming two or more metallic sprocket assembly components, where each of the components have an external surface; aligning two or more sprocket components with one another; and welding together the two sprocket assembly components using capacitor discharge welding.

In a second embodiment, a process according to the first embodiment further comprises the use of powder metal sprocket assembly components.

In a third embodiment, a process according to the first embodiment further comprises the step of providing, prior to the welding step, at least one welding projection on the external surface of at least one metallic sprocket assembly component.

A fourth embodiment provides a process according to the third embodiment, wherein prior to the welding step at least one welding depression on the external surface of at least one metallic sprocket assembly component is provided.

In a fifth embodiment, a process according to the first embodiment further comprises, prior to the welding step, compaction of a powder metal material system into a desired shape and sintering to form at least one powder metal sprocket assembly component.

In a sixth embodiment, a process according to the first embodiment where during the alignment step, two or more sprocket assembly components are phased with respect to each other, is provided. As discussed below, phasing can be accomplished by phasing or offsetting the sprockets by one-half tooth (one-half pitch) or by one-quarter tooth (one-quarter pitch), or any other desired amount of phasing. A phased relationship between a pair of sprockets in a chain system modifies the impact generated and chordal action generated noise spectrums.

A seventh embodiment provides a process according to the sixth embodiment wherein an idler sprocket and two other sprocket assembly components are phased on a common idler shaft.

An eighth embodiment provides a phased sprocket assembly comprising a first sprocket member with a plurality of teeth around its periphery formed of a metallic composition; a second sprocket member with a plurality of teeth around its periphery formed of a metallic composition; wherein the first and second sprocket members are located on a common shaft; the teeth of the first sprocket are circumferentially offset from the teeth of the second sprocket; and the first and second sprocket members are joined by a weld formed through a capacitor discharge welding process.

In a ninth embodiment, a phased sprocket assembly of the eighth embodiment wherein at least one sprocket member is formed of a powder metal composition, is provided.

In a tenth embodiment, a phased sprocket assembly of the eighth embodiment further comprising a third sprocket member on the shaft, wherein the third sprocket member is joined to the second sprocket member by a weld formed through a capacitor discharge welding process, is provided.

In an eleventh embodiment, a phased sprocket assembly of the eighth embodiment wherein the weld is formed along a projection on the external surface of the first sprocket, is provided.

In a twelfth embodiment, a phased sprocket assembly of the eleventh embodiment wherein the weld is formed in a depression on the external surface of the second sprocket, is provided.

For a better understanding of these and other embodiments of the invention, reference should be made to the following detailed description taken in conjunction with the accompanying drawings.

BRIEF DESCRIPTION OF THE DRAWINGS

FIG. 2 is an exploded, perspective view of an idler sprocket multi-piece assembly which can be made using the process of the present invention, illustrating the components of the idler sprocket assembly.

FIG. 3 is a perspective view of an idler sprocket multi-piece assembly which can be made using the process of the present invention, illustrating the assembled components of the idler sprocket assembly.

FIG. 4 is a sectional side view of an assembly made using the process of the present invention.

FIG. 5 is a side view of an assembly made using the process of the present invention, having camshaft sprockets that are phased at one-half tooth.

FIG. 6 is a side view of an assembly made using the process of the present invention, having camshaft sprockets that are phased at one-quarter tooth.

DETAILED DESCRIPTION OF THE PREFERRED EMBODIMENTS

Figure 1:
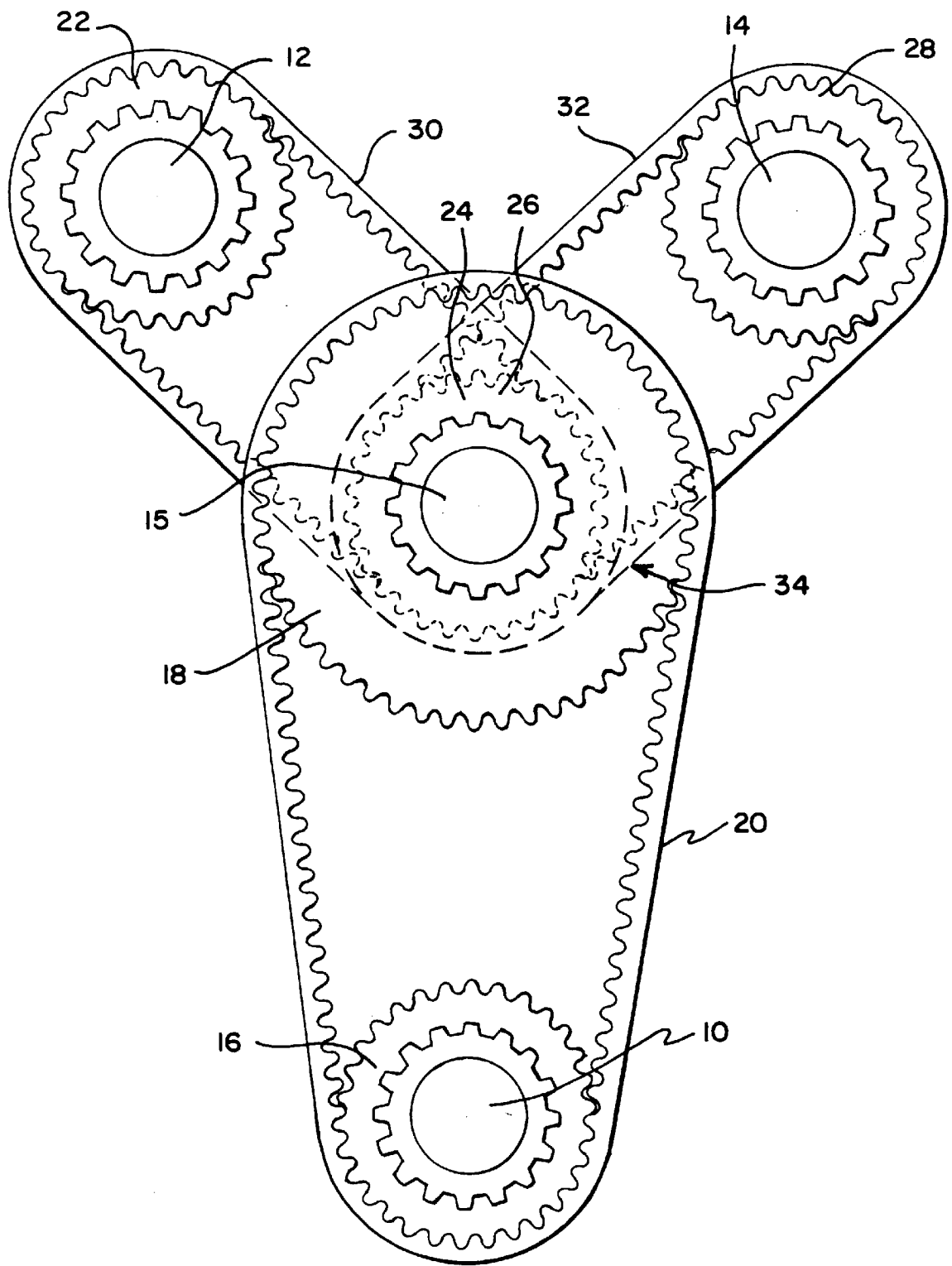
FIG. 1 is a schematic illustrating a timing chain system with a crankshaft, an idler shaft and two overhead camshafts.

The process of the present invention uses capacitor discharge welding of multiple high carbon content components to form complex sprocket geometries at an affordable cost. The invention relates to a process for manufacturing multi-tiered and phased metallic sprocket assemblies using capacitor discharge welding.

The process of the present invention can be used to manufacture phased idler sprocket systems. For example, in such systems, the engine timing system connects the crankshaft with two overhead camshafts by a chain and sprocket system. The crankshaft is connected by a chain to an idler sprocket. Each of the two overhead camshafts are connected to the idler sprocket system by a sprocket on the idler shaft. The one sprocket for each camshaft drive and the idler sprocket are all placed together along a spline or hub to form the idler sprocket assembly. For purposes of this application, the two sprockets on the idler shaft that connect by chain to drive the camshafts will be called "idler cam sprockets" and the single sprocket on the idler shaft that connects by chain to the crankshaft will be called the "idler sprocket." The idler cam sprockets and the idler sprocket each has internal keyways, or internal teeth, which allow the sprockets to be slid onto the spline, which has the same number of keyways, or teeth. In addition, the idler cam sprockets and the idler sprocket each has keyways, or teeth, along its circumference to engage the chain associated with its particular drive. The two idler cam sprockets are positioned on the spline or hub to be phased with respect to each other. Again, phasing can be one-half tooth (one-half pitch) or by one-quarter tooth (one-quarter pitch), or any other desired amount of phasing.

Typically, during assembly of the engine timing system, the spline is positioned along the idler shaft, which is located between the crankshaft and the two overhead camshafts. For example, one idler cam sprocket can be initially positioned on the spline. Then, a second idler cam sprocket may be positioned on the spline, with its outer teeth circumferentially offset or phased with respect to the first idler cam sprocket.

For purposes of this application, "rotation" of one sprocket with respect to another will be defined as rotating one sprocket from a first position of circumferential alignment of both outer sprocket teeth and inner spline teeth of both sprockets to a second position where one sprocket has been rotated by a specified number of internal spline teeth or outer sprocket teeth (and fractions thereof), before placement on the spline in an assembled position.

In addition, for purposes of this application, circumferential "offset" of one sprocket with respect to another will be defined as the fractional part of a sprocket tooth that one sprocket is circumferentially offset or positioned with respect to a sprocket tooth on the adjacent sprocket after assembly on the spline.

Depending on the desired phasing, the second idler cam sprocket may be rotated with respect to the first idler cam sprocket by a predetermined number of spline teeth. After both idler cam sprockets are positioned on the spline or hub, the idler sprocket, which again connects by chain to the crankshaft, may be placed on the spline. A snap ring may then be positioned to hold the idler sprocket assembly together.

Turning now to the drawings, in one embodiment, the current invention is directed to a process for manufacturing phased chain assemblies, and in particular, a process which provides for the phasing of idler sprockets. Phasing is provided to modify the impact generated noise spectrum as well as the chordal action noise spectrum associated with the camshafts.

FIG. 1 illustrates a timing chain system with a crankshaft 10, two overhead camshafts 12, 14 and an idler shaft 15. The crankshaft 10 has a single sprocket 16. Sprocket 18 is an idler sprocket. The crankshaft 10 drives the idler shaft 15 through the chain 20 that interconnects crankshaft sprocket 16 and idler sprocket 18. Two additional sprockets 24, 26 are provided on the idler shaft 15 to drive the camshafts 12, 14. Idler cam sprocket 24 drives the first camshaft 12 through chain 30 and camshaft sprocket 22. In a similar manner, idler cam sprocket 26 drives the second camshaft 14 through chain 32 and camshaft sprocket 28. The idler sprocket 18 and the two idler cam sprockets 24, 26 for each of the camshafts 12, 14 form an idler sprocket assembly 34, along hub 36.

FIG. 2 illustrates an idler sprocket assembly 34 made using the process of the present invention. The idler sprocket assembly 34 positions the three separate sprockets 18, 24, 26 along a spline portion 40 that extends from hub 36. Each of the sprockets 18, 24, 26 has inner keyways or passages to permit attachment of the sprockets to the spline 40.

First, the hub 36 with spline 40 is positioned along the idler shaft 15. The idler sprocket 18, and the camshaft sprockets 24, 26 each have keyways or internal teeth. These internal teeth are such as to allow the sprockets 18, 24, 26 to be slid onto the spline 40 and match the keyways between the spline 40 teeth. In one embodiment, the spline 40 has the same number of teeth around its circumference as the sprockets 18, 24, 26 have internal teeth. Next, the idler cam sprocket 24 is slid onto the spline 40. In these figures, the idler cam sprocket 24 is connected to the left bank camshaft by chain 30. However, the first sprocket positioned on the spline can be connected to drive either the left bank camshaft or the right bank camshaft. In such a system, the remaining idler cam sprocket is connected to drive the remaining left or right bank camshaft.

Next, the second idler cam sprocket 26 is slid onto the spline 40. The second idler cam sprocket 26 is positioned so as to be offset, or phased, from the first idler cam sprocket 24 by a predetermined number of spline 40 teeth in order to achieve phasing of one-quarter pitch or one-half pitch, or another desired amount of phasing or offset of the outer sprocket teeth. Next, the idler sprocket 18 is slid onto the spline 40. Finally, a snap ring 38 is positioned to hold the idler sprocket assembly 34 together on the spline 40. FIG. 3 illustrates an assembled idler sprocket assembly 34, while FIG. 4 illustrates a sectional side view of an assembled idler sprocket assembly 34.

Alternatively, before the sprockets are aligned on the shaft, the sprockets are fixed in position by a capacitor discharge welding process. As know in the capacitor discharge welding art, a high current level pulse is applied to the surfaces of the sprockets. The weld is applied while the sprockets are under high pressure. In this manner, the sprockets are joined and then placed on the spline. The weld location 37 is shown in FIGS. 2 and 4, and constitutes a continuous band around the sprockets. An extension 39 from one sprocket may be used to aid the welding operation, as shown in FIG. 2. Alternatively, a depression 41 formed on a surface that opposes the surface having the extension, may be present at the weld location 37.

FIGS. 5 and 6 illustrate how one-quarter tooth (one-quarter pitch) or one-half tooth (one-half pitch) phasing is accomplished. FIG. 5 illustrates one-half pitch phasing, while FIG. 6 illustrates one-quarter pitch phasing. The one-half or one-quarter tooth phasing refers to the amount that one idler cam sprocket is circumferentially offset from the other idler cam sprocket. The phasing of one-quarter pitch or one-half pitch is accomplished in one preferred embodiment by the use of idler cam sprockets with thirty teeth along their outer circumference and sixteen internal teeth for contacting the spline. Of course, other configurations may be used. The number of spline teeth that one idler cam sprocket must be offset with respect to the second idler cam sprocket is determined by the following ratio:

$$\frac{\text{outer sprocket teeth}}{\text{spline teeth}} = \frac{\text{number of sprocket teeth offset}}{\text{number of spline teeth rotated}}$$

The particular phasing of the idler cam sprockets is determined by the number of sprocket teeth offset. Depending on the number of spline teeth rotated, i.e., how many spline teeth the second idler cam sprocket is rotated with respect to the first idler cam sprocket before being placed on the spline, the number of sprocket teeth offset may not be a whole number. The number of sprocket teeth offset will usually consist of a whole number and a fractional number. The amount of sprocket tooth phasing is determined by the fractional part of the number of sprocket teeth offset.

When the fractional part of the number of sprocket teeth offset is ½, then the second idler cam sprocket is offset ½ outer sprocket teeth from the first idler cam sprocket. One-half phasing of the idler cam sprockets is thus accomplished. Similarly, when the fractional part is ¼ or ¾, the second idler cam sprocket is offset ¼ or ¾ outer sprocket teeth with respect to the first idler cam sprocket. In either case, one-quarter phasing of the idler cam sprockets is obtained.

Therefore, in order to calculate the amount of spline teeth rotation, first, a ratio of outer sprocket teeth to internal spline teeth is determined. For example, in one preferred embodiment with both idler cam sprockets having 30 outer sprocket teeth and 16 internal teeth (or 16 spline teeth), the ratio is 30/16 or 1.875. Second, the number of spline teeth that one idler cam sprocket must be rotated with respect to the second idler cam sprocket to obtain one-quarter or one-half phasing is determined from the above-stated ratios. Again, to obtain this phasing, the fraction part of the number of sprocket teeth offset must be ½ for one-half phasing, or ¼ or ¾ for one-quarter phasing.

In one embodiment, the ratios were used to determine that if the second idler cam sprocket 26 is offset by four spline teeth with respect to the first idler cam sprocket 24, then one-half pitch phasing is accomplished. In particular, an offset of four spline 40 teeth multiplied by the ratio of outer sprocket teeth to spline teeth, or 4×1.875, is 7½ sprocket teeth of offset. Thus, the rotation of one idler cam sprocket with respect to the other idler cam sprocket by four internal spline teeth before placement on the spline results in 7½ sprocket teeth rotation, which corresponds to ½ tooth phasing. Again, the fraction part is ½ and therefore the second idler cam sprocket 26 is offset by ½ outer sprocket teeth from the first idler cam sprocket 24, and one-half phasing is obtained.

For this embodiment, if the second idler cam sprocket 26 is rotated by two spline 40 teeth, with respect to the first idler cam sprocket 24, then one-quarter phasing is accomplished. In particular, an offset of two spline 40 teeth multiplied by the ratio of sprocket teeth to spline teeth, or 2×1.875, is 3¾ sprocket teeth of offset. Thus, the rotation of one idler cam sprocket with respect to the other idler cam sprocket by two internal spline teeth before placement on the spline results in 3¾ sprocket teeth rotation, which corresponds to ¼ tooth phasing. Again, the fraction part is ¾ and therefore the second idler cam sprocket 26 is offset by ¾ outer sprocket teeth to the first idler cam sprocket 24, or the first idler cam sprocket 24 is offset by ¼ outer sprocket teeth to the second idler cam sprocket 26. One-quarter phasing is thus obtained.

Figure 7:
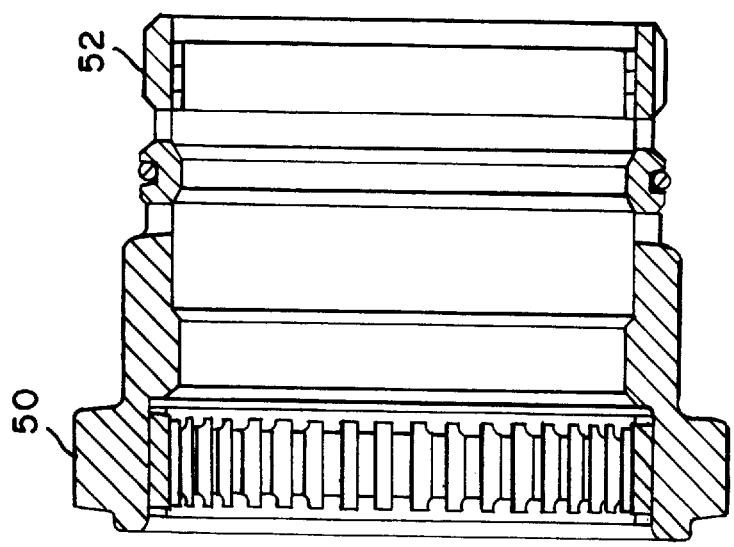
FIG. 7 is a schematic of a drive sprocket for a two piece assembly which can be manufactured using the process of the present invention.

The process of the present invention can be used to weld a powder metal sprocket 50 to a sleeve 52 of dissimilar material (e.g., casting or tubing). For example, FIG. 7 is a schematic of such a two piece assembly which can be manufactured using the process of the present invention.

Those skilled in the art to which the invention pertains may make modifications and other embodiments employing the principles of this invention without departing from its spirit or essential characteristics particularly upon considering the foregoing teachings. The described embodiments and examples are to be considered in all respects only as illustrative and not restrictive. The scope of the invention is, therefore, indicated by the appended claims rather than by the foregoing description. Consequently, while the invention has been described with reference to particular embodiments and examples, modifications of structure, sequence, materials and the like would be apparent to those skilled in the art, yet still fall within the scope of the invention.

EXAMPLE 1

The capacitor welding process for sprocket assembly was performed using sprockets manufactured from MPIF FN-0208 (0.75% carbon) at a density of 6.60–7.00 g/cc. Twelve sprocket combinations were welded and loaded by fixturing one set of sprocket teeth and rotating the other. All twelve sprockets showed an ultimate average strength of 39,000 psi near the weld joint, which is near the expected tensile strength of the material.

What is claimed is:

1. A phased sprocket assembly comprising:
   a first sprocket member with a plurality of teeth around its periphery formed of a metallic composition;
   a second sprocket member with a plurality of teeth around its periphery formed of a metallic composition;
   said first and second sprocket members being located on a common shaft;
   said teeth of said first sprocket being circumferentially offset from said teeth of said second sprocket; and
   said first and second sprocket members being joined by a weld formed through a capacitor discharge welding process.

2. The phased sprocket assembly of claim 1 formed by a process comprising the steps of:
   forming two or more metallic sprocket assembly components, each of said components having an external surface;

aligning said two or more metallic sprocket assembly components; and welding said two or more metallic sprocket assembly components using capacitor discharge welding.

3. A process according to claim 2, wherein said metallic sprocket components are powder metal sprocket assembly components.

4. A process according to claim 2, further comprising the step of providing, prior to the welding step, at least one welding projection on the external surface of at least one metallic sprocket assembly component.

5. A process according to claim 4, further comprising the step of providing, prior to the welding step, at least one welding depression on the external surface of at least one metallic sprocket assembly component.

6. A process according to claim 2, wherein prior to the welding step, a powder metal material system is compacted into a desired shape and sintered to form at least one powder metal sprocket assembly component.

7. A process according to claim 2, wherein during the alignment step, two or more sprocket assembly components are phased with respect to each other.

8. A process according to claim 7, wherein said two or more sprocket assembly components include an idler sprocket and two other sprocket assembly components phased on a common idler shaft.

9. The phased sprocket assembly of claim 1 wherein at least one sprocket member is formed of a powder metal composition.

10. The phased sprocket assembly of claim 1 further comprising a third sprocket member on said shaft, said third sprocket member being joined to said second sprocket member by a weld formed through a capacitor discharge welding process.

11. The phased sprocket assembly of claim 1 wherein said weld is formed along a projection on the external surface of said first sprocket.

12. The phased sprocket assembly of claim 11 wherein said weld is formed in a depression on the external surface of said second sprocket.

* * * * *